United States Patent [19]

Bernhardt et al.

[11] Patent Number: 4,853,438
[45] Date of Patent: Aug. 1, 1989

[54] WATER-SOLUBLE POLYMERS BEARING QUATERNARY AMMONIUM OR PYRIDINIUM GROUPS AND ALKOXYSILYL GROUPS, A METHOD FOR THEIR PREPARATION, AND THE USE THEREOF

[76] Inventors: Günther Bernhardt, Rheinstr. 33, 5205 St. Augustin 2; Horst Hanisch, Fröbelweg 19, 5202 Hennef, both of Fed. Rep. of Germany

[21] Appl. No.: 143,216

[22] Filed: Jan. 7, 1988

Related U.S. Application Data

[63] Continuation of Ser. No. 847,944, Apr. 3, 1986, abandoned.

[30] Foreign Application Priority Data

Apr. 6, 1985 [DE] Fed. Rep. of Germany ....... 3512560

[51] Int. Cl.$^4$ ............................................. C08F 30/08
[52] U.S. Cl. .................................. 525/326.5; 526/260; 526/261; 526/279; 525/479; 427/387
[58] Field of Search ....................... 526/260, 261, 279; 525/326.5, 479; 427/387

[56] References Cited

U.S. PATENT DOCUMENTS

| | | | |
|---|---|---|---|
| 4,260,725 | 4/1981 | Keogh et al. | 526/279 |
| 4,276,402 | 6/1981 | Chromecek et al. | 526/279 |
| 4,478,990 | 10/1984 | Kohno et al. | 526/326.5 |
| 4,625,006 | 11/1986 | Bernhardt et al. | 526/279 |

*Primary Examiner*—Melvyn I. Marquis

[57] ABSTRACT

Disclosed are new copolymers which are useful as adhesion mediating agents. The copolymers of the invention are prepared by the copolymerization of vinyl silanes, vinyl esters of alpha-halogen fatty acids and fatty acid vinyl esters, which are then reacted with tertiary amines. The new polymers are soluble in water and in such solutions they can be used as adhesion mediating agents between silicatic and other materials and polymers.

17 Claims, No Drawings

WATER-SOLUBLE POLYMERS BEARING QUATERNARY AMMONIUM OR PYRIDINIUM GROUPS AND ALKOXYSILYL GROUPS, A METHOD FOR THEIR PREPARATION, AND THE USE THEREOF

This application is a continuation, of application Ser. No. 847,944, filed Apr. 3, 1986, now abandoned.

BACKGROUND OF THE INVENTION

The subject matter of the present invention is water-soluble polymers bearing quaternary ammonium or pyridinium groups, as well as alkoxysilyl groups, which are effective adhesion mediating agetts.

Nonionic copolymers which serve as adhesion mediating agents, and which are solbble or emulsifiable in water, are disclosed in DE-OS No. 32 27 552. They are obtained by the reaction of an alkali salt of acrylic acid or methacrylic acid with water-soluble polymers which contain reactive halogen atoms and are prepared from ethylenically unsaturated alkoxysilanes, vinyl esters of alpha-halogen fatty acid esters, an additional, functionalized, water-soluble comonomer from the group N-vinylpyrrolidone, vinyl methyl ether, N-vinylmorpholine and N-vinyl-1,3-oxazidinone-2 and, in some cases, an additional nonfunctionalized ethylenically unsaturated comonomer.

These known, water-soluble adhesion mediating agents have the disadvantage, however, that they must contain high percentages of the functionalized water-soluble comonomer in the polymer in order to achieve the desired solubility in water. Thus, the content of these comonomers in the polymer must be greater than 30% by weight in order to make the adhesion mediating agent water-soluble.

The problem was therefore to make available water-soluble, polymeric adhesion mediating agents which either do not contain this water-soluble comonomer or contain it only in a greatly reduced amount, nnd to make available a method for their preparation.

THE INVENTION

As the solution to this problem, copolymers containing alkoxysilyl groups have been found. The copolymer of the invention is prepared from a water-insoluble copolymer which contains a reactive halogen atom, and which said copolymer is obtained by copolymerization of (a) 2 to 30 wt.-% of a vinylalkoxysilane or methacryloxypropylalkoxysilane;
(b) 2 to 30 wt.-% of a vinyl ester of an alpha-halogen fatty acid or of a methyl styrene halogenated in the methyl group;
(c) 40 to 96 wt.-% of a fatty acid vinyl ester, an acrylic acid alkyl ester and/or methacrylic acid alkyl ester;
(d) 0 to 56 wt.-% of styrene;
(e) 0 to 30 wt.-% of an ethylenically unsaturated monomer of the general formula I

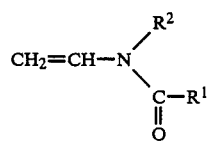

wherein $R^1$ represents $C_1$ to $C_3$ unsubstituted alkyl groups and $R^2$ represents $C_1$ to $C_4$ unsubstituted alkyl groups, or $R^1$ and $R^2$ can be a common component of a group $(CH_2)_n$ with $n=3$ to 5, and the ring can be interrupted between two carbon atoms by an oxygen atom. The water-soluble copolymer of this invention contains furthermore either the group

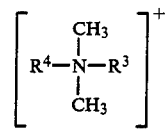

wherein $R^3$ represents the halogen-free moiety of the copolymer A, and $R^4$ represents an acryloxyethyl or methacryloxyethyl moiety, or the vinyl pyridinium group.

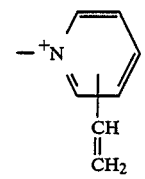

The water-soluble copolymers of this invention containing alkoxysilyl groups have an excellent adhesion mediating action between inorganic oxide materials and polymers.

The base polymer in the new copolymers is a copolymer A containing halogen, which also serves as a base polymer in the case of the polymeric adhesion mediating agents according to DE-OS No. 32 27 552 and U.S. Pat. No. 4,625,006, the disclosure of which is incorporated by reference.

A halogenated base copolymer contains preferably 5 to 25% by weight of vinylalkoxysilane or methacryloxy propyl trialkoxysilane, 5 to 25% by weight of a vinyl ester of an alpha-halogen fatty acid, 50 to 90% by weight of a fatty acid vinyl ester, acrylic acid alkyl ester and/or methacrylic acid alkyl ester, 0 to 50% by weight of styrene, and 0 to 25% by weight of a comonomer of the general formula I:

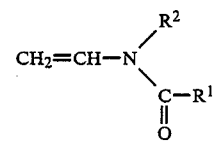

wherein $R^1$ represents $C_1$ to $C_3$ alkyl groups and $R^2$ represents $C_1$ to $C_4$ alkyl groups, or $R^1$ and $R^2$ are common components of a group $(-CH_2-)_n$ in which n can be equal to 3 to 5 and the ring can be interrupted between two carbon atoms by an oxygen atom.

The vinyl silanes which are copolymerized into the base copolymers are preferably vinyltrialkoxysilanes or methacryloxypropylalkoxysilanes whose alkoxy groups have 1 to 4 carbon atoms each, e.g., vinyltrimethoxysilane, vinyltriethoxysilane, methacryloxypropyltrimethoxysilane and methacryloxypropyltriethoxysilane.

The vinyl esters of alpha-halogen fatty acids copolymerized into the base copolymers are preferably chloroacetic acid vinyl esters or bromoacetic acid vinyl esters. In general, however, the fatty acid component can also contain as many as 6 carbon atoms. Instead of these vinylesters, also be used methyl styrene halogenerated in the methyl group, in same quantities.

In the fatty acid vinyl esters used in the preparation of the base copolymers the fatty acid can have up to 18 carbon atoms. Examples of suitable fatty acid vinyl esters are:

Vinyl acetate, vinyl propionate, Vinyl laurate or vinyl stearate; the useable acrylic acid esters are those from the group: methylacrylate ethylacrylate, isopropylacrylate, n-butylacrylate, isobutylacrylate or 2-ethylhexylacrylate, and the useable methacrylic acid esters include those from the group: methylmethacrylate, ethylmethacrylate, propylmethacrylate, butylmethacrylate and their isomers, or 2-ethylhexylmethacrylate.

If styrene is used as comonomer the component c is preferably an acrylic acid alkyl ester or methacrylic acid alkyl ester.

Examples of the comonomers of the general formula I,

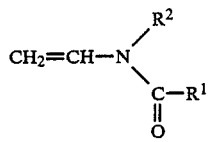

are N-vinylpyrrolidone N-methylvinylacetamide, N-vinylmorpholinone-2 or N-vinyl-1,3-oxazidinone-2.

The above-named ethylenically unsaturated comonomers on which the base copolymers are based can be copolymerized easily by known free-radical methods. The polymerization is performed in the presence of initiators known in themselves, including compounds such as, for example, organic peroxides or azoisobutyric acid dinitriles. The following are given as examples:

Benzoyl peroxide, diacetyl peroxide, methylethylketone peroxide, methylisobutylketone peroxide, cyclohexanone peroxide, cymenehydroperoxide, tert.-butyl hydroperoxide, di-tert.-butylperoxide, dicumylperoxide, 1,3-di-tert.butylperoxyisopropylbenzene, tert.-butyl peracetate, tert.butyl peroctane, and tert.-butyl perpivalate. The initiator is used in amounts of 0.2 to 3% by weight, with respect to the weight of the unsaturated monomers, which usually suffices to achieve a reasonable reaction rate and a high monomer transformation.

The polymerization to the chlorinated copolymers can be performed in substance, i.e., without the additional use of a diluent or solvent. Preferably, however, it is performed by solution polymerization.

Those solvents can be used for this purpose which in no way interfere with the polymerization or in no way react with the alkoxysilyl group or the halogen-carboxylic acid moiety of the vinyl monomers. Suitable solvents are fatty acid esters, such as for example acetic acid ethyl ester or methylglycol acetate, ketones such as acetone or methyl ethyl ketone or aromatic hydrocarbons, such as, for example, benzene or toluene or alcohols, such as methanol, ethanol or isopropanol. The ratio by weight of the useable monomers to the solvents can vary between 4:1 and 1:4.

Th copolymerization described is generally performed by bringing all hhe monomers together in the reaction vessel and bringing them into reaction randomly according to their relative concentrations and relative reactivities, so that polymers are formed having raddomly distributed groupings of the monomers. For the increase or reduction of the nonuniformity of the polymers, however, one or more of the ethylenically unsaturated monomers can be injected during the polymerization. The nature of these reactions is generally known in the field of free-radical polymerization.

The preperation of the copolymers of the invention which act as adhesion mediating agents and have a functional ammonium group, of the general formula II:

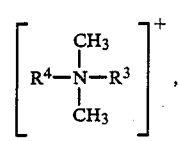

in which the moiety $R^3$ represents the halogen-free moiety of the halogenated base copolymer which can already contain ammonium groups of general formula II, and $R^4$ represents an acryloxyethyl or methacryloxyethyl group, is accomplished by reacting the base copolymer containing reactive halogen atoms with dimethylaminoethyl acrylate or dimethylamino acrylate. The amino compounds are used in such amounts that 0.5 to 1.5 mol of amino compounds are available for each gram atom of halogen in the base copolymers; preferably the ratio is 1:1.

The preparation of the copolymers having a 2- or 4-vinylpyridinium group according to the invention and which act as adhesion mediating agents, is accomplished by the reaction of the copolymers containing the reactive halogen atoms with 2- or 4-vinylpyridine. The vinylpyridines are used in such amounts that 0.5 to 1.5 moles of the pyridine compounds are available for each gram atom of reactive halogen in the base copolymers. Preferably the ratio amounts of 1:1.

A preferred embodiment of the reaction with the aminoethyl-(meth)acrylates or vinylpyridines, which are generally referred to herein also as tertiary amines, consists in the use of solutions of the starting copolymers, as they are produced, for example, in the solution polymerization for the production of the copolymers having the base units containing the halogen carboxylic acid moiety. The solvent used in this case, however, can also be replaced wholly or partially by a solvent suitable for the reaction.

The reaction with the chlorinated base polymers generally takes place above 30° C. For the reasons given below, however, it is recommendable to operate in the temperature range between 50° and 120° C.

In the production of the adhesion mediating agent according to the invention it is advantageous to render the residual initiators contained in the starting polymers ineffective. This is accomplished, in appreferred embodiment, by heating these polymer solutions, prior to the reaction with the tertiary amines, to temperatures above the degradation temperature, until the initiators are totally destroyed.

The initiators can also be rendered ineffective by the addition of stabilizers which act as polymerization inhibitors, such as for example di-tert.-butylcresol, hydroquinone monomethyl ether, phenol, pyrogallol, hydroquinone or phenothiazine. Other suitable stabilizers are known to the skilled practitioner of the art. If used in an amount of about 0.01 to 3% of the weigh of the polymers, these stabilizers prevent the intermolecular crosslinking of the polymeric adhesion mediating agent during preparation, processing and storage.

The copolymers obtained by this reaction act as adhesion mediating units between polymers and fillers, pigments or dyes. The polymers are any polymers which can be modified by free-radical reactions to three-dimensional networks. Examples of such polymers are polyethylene, polypropylene, ethylene-propylene copolymers, ethylene-propylene-dicyclopentane terpolymers, polybutadiene, natural rubber, polyamides, polyvinylalkylethers,sstyrene copolymers such as styrene-butadiene rubber, vinyl chloride copolymers such as vinyl chloride-vinyl acetate copolymers, ethylenevinylacetate copolymers, polyacrylate, polyesters or unsaturated polyesters or mixtures of these polymers.

Especially good adhesion mediating action is shown by the new copolymers in the case of unsaturated polyester compositions, especially when they are used with copolymerizable solvents. The acid component of the polyesters can consist in that case of unsaturated dicarboxylic acids, such as fumaric acid, maleic acid, maleic acid anhydride, itaconic acid and additional saturated dicarboxylic acids, such as phthalic acid, isophthalic acid, adipic acid etc. The alcohol component includes, among others, bifunctional alcohols, such as ethylene glycol, 1,2-propyleneglycol, 1,3-butylene glycol, neopentyl glycol, etc. Suitable copolymerizable solvents are, for example, styrene, diallylphthalate, acrylic acid-tert.-butylester. The polymerizable solvents can amount to as much as 60% of the polyester solution.

The fillers, pigments or dyes with which the polymers can be combined while using the adhesion mediating agents according to the invention include inorganic-oxidic materials, such as substances containing silicon dioxide, and metals and metal alloys, and metal oxides. Examples of substances containing silicon dioxide are glass, quartz, ceramic, sand, brick, tile, asbestos and clay. Suitable metals in such compositions are mainly aluminum, zinc, tin, magnesium, silver and nickel, as well as metal alloys such as steel, chromium nickel, bronze, or also metals which have been surface treated with phosphates, for example, The metal oxides include, for example, aluminum oxide, zinc oxide, titanium oxide, iron oxide, and chromium oxide.

The preparation of the composition of a polymer and the above-named inorganic oxide materials with the aid of an adhesion mediating agent according to the invention is performed in a known manner, such as the one described, for example, in DE-PS No. 12 70 716, the adhesion mediating agent being applied to the surface of the inorganic oxide material from an aqueous solution or a solution containing water, preferably prior to the preparation of the composition.

EXAMPLE 1

In a one-liter glass autoclave, 60 g of vinyl acetate (distilled), 25 g of N-vinylpyrrolidone (distilled), 10 g of vinyltriethoxysilane (distilled), 5 g of vinylchloroacetate (distilled), 61.3 g of ethanol and 0.2 g of azoisobutyric acid dinitrile were heated with stirring (100 rpm) to 100° C. in a nitrogen atmosphere. Over a period of 7 hours, 10 ml of a solution of 1 g of the initiator dissolved in 38.7 g of ethanol (=50 ml of solution) was added through a feeder pump every ninety minutes. After 8 hours the polymerization was terminated. A determination of the polymer solution obtained showed a transformation of 91.1%. The average molecular weight (Mw) of the polymer obtained was determined to be 13200.

The 192.3 g remaining in the autoclave after samples were taken was treated with 6.8 ml=6.3 g of 98.5% dimethylaminoethylmethacrylate and 0.19 of p-tert-.butylpyrocatechol and heated to 95° to 98° C. under nitrogen gas, and held at this temperature for 3 hours. 122.4 g of a clear solution was obtained.

To determine the chlorine content, 2.6 g of this solution was accurately weighed into a 50 ml measuring flask and, after the addition of methanol and 2 g of ammonium nitrate, the development of a clear solution was awaited. After the addition of 10 ml of 0.1 N silver nitrate solution, the flask was filled up to the measurement mark and let stand for 24 hours in darkness. The titration of the filtrate according to Volhard showed 73.1% of the theory of chloride, which corresponds to the quaternation yield.

On a film made by the film casting method, the methacrylate double bond was determined at 1640 cm$^{-1}$ by infrared measurement.

A 1% priming solution of pH 5 was produced from the polymer solution by dilution with water and the addition of acetic acid.

Five microscope slides with degreased surfaces were set up at an angle of inclination of about 80° and wetted with the 1% priming solution. After drying the solution for 10 minutes, the primed plates were treated for one hour at 110° C. in a drying oven and covered with a 1 mm thick layer of a styrene-containing UP resin resistant to boiling temperatures (Palatl ® A-410, commercial product of BASF) and containing 2 g of cobalt octoate and 1 g of acetylacetone peroxide for each 100 grams of resin.

After one hour of standing at 23° C. under a carbon dioxide atmosphere, the coated microscope slides were cured for 2 hours at 100° C.

As samples for comparison, unprimed microscope slides were coated in the same manner with a layer of UP resin.

The bond between the resin coating and the glass was tested by immersion in boiling water. In the unprimed microscope slides the UP resin layer came off within five minutes, but in the primed slides it was stil good after one hour of boiling.

EXAMPLE 2

Example 1 was repeated, except that 61.2 g of methyl glycol acetate was used instead of ethanol as solvent. The polymerization yield was 98.3%, the quaternation yield was 78.3%.

The testing of the priming agent according to Example 1 showed that the bond between the resin coating and glass was resistant to boiling for more than one hour.

EXAMPLE 3

In a one-liter glass autoclave, 75 g of vinyl acetate (distilled), 10 g of vinyltriethoxysilane (distilled), 15 g of vinyl chloroacetate (distilled), 60 g of ethanol and 0.2 g of azoisobutyric acid dinitrile were heated at 100° C. with moderate stirring and in a nitrogen atmosphere. Over a period of 7 hours, 10 ml of a solution of 1 g of the initiator in 38.7 g of ethanol (=50 ml of solution) was injected through a feed pump at the end of every 90 minutes. After 8 hours the polymerization was terminated. The determination of the solid matter in the polymer solution obtained showed a transformation of 98.0%. The content of the autoclave was treated with 20.4 ml, equal to about 18.9 g, of 98.5% dimethylaminoethylmethacrylate and 0.21 g of hydroquinone monomethyl ether, and was maintained under nitrogen for 3 hours at 95 to 98° C. 205.0 g of a clear solution was obtained.

The determination of chloride as in Example 1 indicated a quaternation yield of 80.1%. The water-soluble primer test in accordance with Example 1 indicated that the bond between the resin coating and glass withstood boiling for more than one hour.

EXAMPLE 4

In a glass autoclave, 50 g of ethyl acrylate (distilldd), 10 g of methacryloxypropyl trimethoxysilane, 20 g of methyl methacrylate (distilled) and 20 g of chloromethylstyrene were mixed with 61.5 g of methanol. 0.4 g of azoisobutyric acid dinitrile was added, and the mixture was heated at 65° C. in a nitrogen atmosphere, with stirring.

Over a period of 7 hours, 10 ml of a solution of 1 g of the initiator in 38.7 g of ethanol (=50 ml of solution) was injected through a feed pump at 90 minute intervals. After a total reaction time of 8 hours at 65° C., the autoclave content was heated for 1 hour at 100° C. The determination of the solid matter in a sample of the polymer solution then obtained showed a transformation of 96.2%.

After cooling to 40° C., 20.6 g of a 98.5% dimethylaminoethyl methacrylate and 0.3 g of p-tert.-butylpyrocatechol were added to the autoclave content, and the mixture was heated under nitrogen for 2.5 hours at 98° C. 206.4 g of a clear solution was obtained.

Chloride determination as in Example 1 showed a quaternation yield of 78.8%.

The testing of the product as a primer add adhesion mediating agent in accordance with Example 1 showed that the bond between the resin coating and glass was resistant to boiling for more than one hour.

EXAMPLE 5

In a glass autoclave, 60 g of ethyl acrylate (distilled), 8 g of methacryloxypropyl triethoxysilane, 12 g of styrene (distilled) and 20 g of chloromethylstyrene were mixed with 61.5 g of ethanol. 0.4 g of azoisobutyric acid dinitrile was added, and the mixture was heated to 75° C. with stirring (110 rpm)uunder a nitrogen atmosphere. Over a period of 7 hours, 10 ml of a solution of 1 g of the initiator in 38.7 g of ethanol (=50 ml of solution) was injected through a feed pump at the end of every 90 minutes. After a reaction time totaling 8 hours at 75° C., the autoclave content was raised to a temperature of 103° C. for 45 minutes. The determination of the solid matter in the polymer solution thus obtained, based on a sample, showed a transformation of 97.3%.

After cooling to 45° C., 13.8 g of 4-vinylpyridine (97% pure) and 0.20 g of p-tert.-butylpyrocatechol were added and the mixture maintained at 95° C. under nitrogen for 3 hours. 199.6 g of a clear solution was obtained.

Chlorine determination in accordance with Example 1 gave a quaternation yield of 82.3%. The testing of the product as a primer and adhesion promoting agent miscible with water, as in Example, showed that the bond between the resin coating and glass withstood boiling for more than one hour.

It will be understood that the specification and examples are illustrative but not limitative of the present invention, and that other embodiments within the spirit and scope of the invention will suggest themselves to those skilled in the art.

We claim:

1. A copolymer formed by polymerizing at least three dffferent ethylenically unsaturated constituents, each of said constituents having two chain carbon atoms wherein a first of said ethylenically unsaturated constituents is linked with a Carboxylic acid moiety through an oxygen atom of said acid moiety, said acid moiety having an α-position carbon atom which is substituted with a halogen, said first constituent being present in an amount of 2 to 30 wt.-%; 2 to 30 wt.-% of a second of said constituents having an alkoxysilyl moiety linked to one of the chain carbon atoms of said second constituent directly or through a group

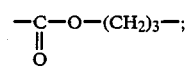

and 40 to 96 wt.-% of a carboxylic acid ester with an unsaturated grouping from the group consisting of a fatty acid vinyl ester, an acrylic acid alkyl ester and a methacrylic acid alkyl ester, to form a halogenated base copolymer; and reacting the halogenated base copolymer with a tertiary amine to form the copolymer wherein the α-position carbon atom is substituted with a grouping

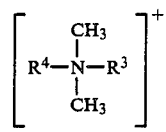

wherein $R^3$ represents the halogen-free moiety of the base copolymer, and $R^4$ represents an acryloxyethyl or methacryloxyethyl moiety, or a vinyl pyridinium grouping of the formula

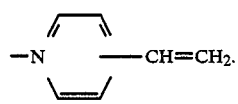

2. A method of adhering an inorganic oxide and a polymer comprising: applying as an adhesive the copolymer of claim 1.

3. An adhesion mediating agent comprising the water soluble copolymer of claim 1.

4. The copolymer of claim 1 including polymerizing therein up to 56 wt.-% of styrene and/or up to 30 wt.-% of an ethylenically unsaturated monomer of the general formula

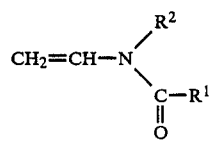

I wherein $R^1$ represents $C_1$ to $C_3$ alkyl groups and $R^2$ represents $C_1$ to $C_4$ alkyl groups, or $R^1$ and $R^2$ can be a common component of a group $(CH_2)_n$ with n=3 to 5 to form a ring, and the ring can be interrupted between two carbon atoms thereof by an oxygen atom.

5. The copolymer of claim 1, wherein the second constituent is selected from the group consisting of vinylalkoxysilane and methacryloxy propylalkoxysilane.

6. A copolymer formed by polymerizing at least three different ethylenically unsaturated constituents, each of said constituents having two chain carbon atoms wherein a first of said ethylenically unsaturated constituents is linked with methylstyrene, monohalogenated in the methyl group, said first constituent being present in an amount of 2 to 30 wt.-%; 2 to 30 wt.-% of a second of said constituents having an alkoxysilyl moiety linked to one of the chain carbon atoms of said second constituent directly or through a group

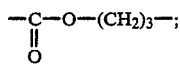

and 40 to 96 wt.-% of an acrylic or methacrylic acid alkyl ester to form a halogenated base copolymer and reacting the halogenated base copolymer with a tertiary amine to form the copolymer wherein the methyl group is substituted with a grouping

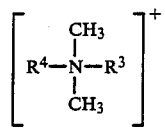

wherein $R^3$ represents the halogen-free moiety of the base copolymer, and $R^4$ represents an acryloxyethyl or methacryloxyethyl moiety, or a vinyl pyridinium grouping of the formula

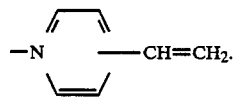

7. A method of adhering an inorganic oxide and a polymer comprising: applying as an adhesive the copolymer of claim 6.

8. The copolymer of claim 6 further comprising polymerizing therein 0 to 56 wt.-% of styrene and/or 0 to 30 wt.-% of an ethylenically unsaturated monomer of the general formula

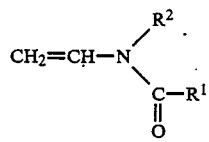

wherein $R^1$ represents $C_1$ to $C_3$ alkyl groups and $R^2$ represents $C_1$ to $C_4$ alkyl groups, or $R^1$ and $R^2$ can be a common component of a group $(CH_2)_n$ with $n=3$ to $5$ to form a ring, and the ring can be interrupted between two carbon atoms thereof by an oxygen atom.

9. An adhesion mediating agent comprising the water soluble copolymer of claim 6.

10. A method of preparing a water-soluble polymer containing alkoxysilyl groups, wherein a water-insoluble polymer containing reactive halogen atoms prepared by polymerizing
 (a) 2 to 30 wt.-% of methacryloxypropylalkoxysilane;

(b) 2 to 30 wt.-% of a methylstyrene monohalogenated in the methyl group;
(c) 40 to 96 wt.-% of an acrylic acid alkyl ester and/or methacrylic acid alkyl ester;
(d) 0 to 56 wt.-% of styrene;
(e) 0 to 30 wt.-% of an ethylenically unsaturated monomer of the general formula I

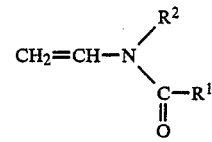

wherein $R^1$ represents $C_1$ to $C_3$ alkyl groups and $R^2$ represents $C_1$ to $C_4$ alkyl groups, or $R^1$ and $R^2$ can be a common component of a grouping $(CH_2)_n$ with $n=3$ to $5$ to form a ring, and the ring can be interrupted between two carbon atoms thereof by an oxygen atom, is reacted with a tertiary amine to form the corresponding polymer of claim 6.

11. The method of claim 10, wherein the tertiary amine is selected from the group consisting of dimethylaminoethyl acrylate, or dimethylaminoethylmethacrylate.

12. The method of claim 10, wherein the reaction is performed at temperatures between 5 and 120° C.

13. The method of claim 10, wherein polymerization inhibitors are added to the reaction mixture prior to the addition of the tertiary amine.

14. A method of preparing a water-soluble polymer containing alkoxysilyl groups, comprising: forming a water-insoluble polymer containing reactive halogen atoms by polymerizing
 (a) 2 to 30 wt.-% of a vinylalkoxysilane or methacryloxy-propylalkoxysilane;
 (b) 2 to 30 wt.-% of a vinyl ester of an alpha-halogen fatty acid;
 (c) 40 to 96 wt.-% of a fatty acid vinyl ester, an acrylic acid alkyl ester and/or methacrylic acid alkyl ester;
 (d) 0 to 56 wt.-% of styrene; and
 (e) 0 to 30 wt.-% of an ethylenically unsaturated monomer of the general formula I

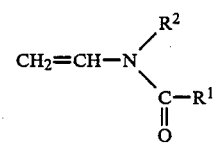

wherein $R^1$ represents $C_1$ to $C_3$ alkyl groups and $R^2$ represents $C_1$ to $C_4$ alkyl groups, or $R^1$ and $R^2$ can be a common component of a grouping $(CH_2)_n$ with $n=3$ to $5$ to form a ring, and the ring can be interrupted between two carbon atoms thereof by an oxygen atom; and reacting the water-insoluble polymer with a tertiary amine to form the water soluble polymer.

15. The method of claim 14, wherein the tertiary amine is selected from the group consisting of dimethylaminoethylacrylate, dimethylaminoethylmethacrylate, 2-vinyl pyridine and 4-vinyl pyridine.

16. The method of claim 14, wherein the reaction is performed at temperatures between 50° and 120° C.

17. The method of claim 14, wherein polymerization inhibitors are added to the reaction mixture prior to the addition of the tertiary amine.

* * * * *

UNITED STATES PATENT AND TRADEMARK OFFICE
CERTIFICATE OF CORRECTION

PATENT NO. : 4,853,438

DATED : August 1, 1989

INVENTOR(S) : Günther Bernhardt et al

It is certified that error appears in the above-identified patent and that said Letters Patent is hereby corrected as shown below:

Column 1, line 40, "nnd" should read --and--.

Column 3, line 10, after "methylacrylate" insert --,--.

Column 3, line 64, "hhe" should read --the--.

Column 3, line 68, "raddomly" should read --randomly--.

Column 4, line 55, "appreferred" should read --a preferred--.

Column 4, line 67 "weigh" should read --weight--.

Column 6, line 8, "122.4" should read --192.4--.

Column 6, line 44, "stil" should read --still--.

Column 7, line 14, "distilldd" should read --distilled--.

Column 7, line 36, "add" should read --and--.

Column 7, line 47, "uunder" should read --under--.

UNITED STATES PATENT AND TRADEMARK OFFICE
CERTIFICATE OF CORRECTION

PATENT NO. : 4,853,438

DATED : August 1, 1989

INVENTOR(S) : Günther Bernhardt et al

It is certified that error appears in the above-identified patent and that said Letters Patent is hereby corrected as shown below:

Column 8, line 9, "Carboxylic" should read --carboxylic--.

Column 9, line 9 (claim 6), "sadd" should read --said--.

Signed and Sealed this

Seventh Day of August, 1990

Attest:

HARRY F. MANBECK, JR.

*Attesting Officer*    *Commissioner of Patents and Trademarks*